(12) United States Patent
Takahashi (10) Patent No.: US 10,895,243 B2
(45) Date of Patent: Jan. 19, 2021

(54) CONDITION MONITORING DEVICE

(71) Applicant: NTN CORPORATION, Osaka (JP)

(72) Inventor: Toru Takahashi, Kuwana (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 16/328,163

(22) PCT Filed: Aug. 2, 2017

(86) PCT No.: PCT/JP2017/027959
§ 371 (c)(1),
(2) Date: Feb. 25, 2019

(87) PCT Pub. No.: WO2018/043009
PCT Pub. Date: Mar. 8, 2018

(65) Prior Publication Data
US 2019/0195192 A1    Jun. 27, 2019

(30) Foreign Application Priority Data

Aug. 31, 2016  (JP) .................................. 2016-168909

(51) Int. Cl.
*F03D 9/00* (2016.01)
*H02P 9/04* (2006.01)
(Continued)

(52) U.S. Cl.
CPC ............. *F03D 1/0675* (2013.01); *F03D 1/06* (2013.01); *F03D 7/0276* (2013.01); *F03D 17/00* (2016.05); *G01M 99/00* (2013.01); *Y02E 10/72* (2013.01)

(58) Field of Classification Search
CPC .............................. F03D 17/00; F03D 7/0276
See application file for complete search history.

(56) References Cited

U.S. PATENT DOCUMENTS 10,337,957 B2 * 7/2019 Hedin .................... G01M 13/00
2007/0265843 A1 * 11/2007 Hetherington .......... G10L 25/84
704/228
(Continued)

FOREIGN PATENT DOCUMENTS

CN    103353396 A    10/2013
CN    103884502 A    6/2014
(Continued)

OTHER PUBLICATIONS

International Search Report issued in International Application No. PCT/JP2017/027959, dated Oct. 31, 2017.
(Continued)

*Primary Examiner* — Tulsidas C Patel
*Assistant Examiner* — Thomas K Quigley
(74) *Attorney, Agent, or Firm* — McDermott Will & Emery LLP (57) ABSTRACT

A condition monitoring apparatus which monitors a condition of equipment including a rotor includes a storage and a calculator. The storage stores a plurality of results obtained from a plurality of divided data strings, respectively, resulting from division of a data string obtained by sampling at a regular time interval of signals from sensors provided in the equipment. The calculator estimates a plurality of rotation speeds corresponding to the plurality of divided data strings from the plurality of results accumulated in the storage, respectively, corrects the plurality of divided data strings based on the plurality of rotation speeds, respectively, and generates a corrected data string by combining the plurality of corrected divided data strings. A condition monitoring apparatus capable of accurately analyzing data obtained from the sensors while increase in cost is suppressed and influence by variation in rotation is lessened is thus provided.

6 Claims, 10 Drawing Sheets

(51) Int. Cl.
*F03D 1/06* (2006.01)
*F03D 17/00* (2016.01)
*G01M 99/00* (2011.01)
*F03D 7/02* (2006.01)

(56) References Cited

U.S. PATENT DOCUMENTS

| | | | | |
|---|---|---|---|---|
| 2008/0234964 | A1* | 9/2008 | Miyasaka | G01H 1/003 702/113 |
| 2011/0098968 | A1* | 4/2011 | Srinivasa | G01H 1/003 702/145 |
| 2011/0295556 | A1* | 12/2011 | Hedin | G01H 1/003 702/182 |
| 2011/0301872 | A1* | 12/2011 | Hedin | G01H 1/003 702/34 |
| 2012/0019723 | A1* | 1/2012 | McGrath | H04S 3/002 348/571 |
| 2012/0072136 | A1* | 3/2012 | Hedin | G01H 1/003 702/56 |
| 2013/0049733 | A1* | 2/2013 | Neti | F03D 7/0272 324/71.1 |
| 2013/0096848 | A1* | 4/2013 | Hatch | G01M 13/045 702/39 |
| 2014/0152331 | A1* | 6/2014 | Wagoner | G01R 31/42 324/705 |
| 2014/0358474 | A1 | 12/2014 | Hall et al. | |
| 2016/0033580 | A1 | 2/2016 | Qiao et al. | |
| 2018/0335765 | A1* | 11/2018 | Tezuka | G05B 19/404 |
| 2019/0383702 | A1* | 12/2019 | Hedin | G01H 1/003 |

FOREIGN PATENT DOCUMENTS

| | | |
|---|---|---|
| CN | 105806613 A | 7/2016 |
| GB | 2535167 A | 8/2016 |
| JP | 2007-003385 A | 1/2007 |
| JP | 2011-252753 A | 12/2011 |
| JP | 2015-034776 A | 2/2015 |
| JP | 2015-175828 A | 10/2015 |

OTHER PUBLICATIONS

Extended European Search Report issued in corresponding European Patent Application No. 17846018.4, dated Mar. 17, 2020.
Chinese Office Action issued incorresponding Chinese Patent Application No. 201780052961.9. dated Jun. 19, 2020, with English translation.

\* cited by examiner

TIME

| SLOT NUMBER | S(0) | S(1) | S(2) |
|---|---|---|---|
| SCALING FACTOR FOR ROTATION SPEED | REFERENCE(=1) | $\alpha(1)$ | $\alpha(2)$ |
| SAMPLING INTERVAL AFTER CONVERSION | T | T1(= T/$\alpha(1)$) | T2(=T/$\alpha(2)$) |
| DATA STRING D(k) | D(0),D(1),⋯D(u−1) | D(u),D(u+1),⋯,D(2u−1) | D(2u),⋯, |
| RATIO R OF SAMPLING INTERVAL | 1,1,1,⋯,1 | 1/$\alpha(1)$,1/$\alpha(1)$,⋯, 1/$\alpha(1)$ | 1/$\alpha(2)$,⋯ |
| CUMULATIVE VALUE OF RATIOS | 1,2,3,4,⋯, | 1027.3, 1028.4, 1029.5, 1030.6,⋯ | |
| RESAMPLED DATA NUMBER | 1,2,3,4,⋯, | 1027, 1028, 1030, 1031,⋯ | |

CONDITION MONITORING DEVICE

CROSS REFERENCE

This application is a U.S. National Phase under 35 U.S.C. § 371 of International Application No. PCT/JP2017/027959, filed on Aug. 2, 2017 which claims the benefit of Japanese Application No. 2016-168909, filed on Aug. 31, 2016, the entire contents of both are hereby incorporated by reference.

TECHNICAL FIELD

This invention relates to a condition monitoring apparatus and particularly to a condition monitoring apparatus which monitors a condition of a rotor.

BACKGROUND ART

A monitoring apparatus which obtains data representing a condition of equipment such as vibration data or temperature data for diagnosis of a failure of various types of rotating equipment has been known. For example, in diagnosing an abnormality condition of equipment or facilities by measuring vibration of a rotary portion, a monitoring person determines occurrence of an abnormal condition based on tendency of increase in feature value (an effective value, a kurtosis, a peak value, or a crest factor) extracted from vibration data obtained by the monitoring apparatus. In order to estimate a cause of occurrence of an abnormal condition, a technique to analyze a frequency of vibration data is employed.

Japanese Patent Laying-Open No. 2015-34776 (PTL 1) discloses a method of diagnosing a reduction gear of a multijoint robot as one example of a diagnosis method with the use of such a monitoring apparatus.

CITATION LIST

Patent Literature

PTL 1: Japanese Patent Laying-Open No. 2015-34776

SUMMARY OF INVENTION

Technical Problem

A condition monitoring system (CMS) which measures vibration of a mechanism such as a bearing of a main shaft or a gearbox with a vibration sensor and monitors a condition of the mechanism in a wind turbine generator has been known.

Since a rotation speed of a wind turbine is varied due to variation in wind speed or wind direction, a frequency of vibration to be analyzed is varied also in a condition monitoring system of a wind turbine generator and a frequency spectrum fluctuates. Though variation in rotation speed can be suppressed by controlling operations of the wind turbine, variation to some extent is unavoidable. Data to be used for frequency analysis requires a measurement period not less than several rotations of a target rotating object. Only a short measurement period is required for an object which rotates at a high speed, whereas a measurement period from several seconds to several ten seconds is required for an object which rotates at a low speed. Though variation in rotation speed is ignorable in an example requiring a short measurement period, accuracy in analysis disadvantageously lowers in an example requiring a long measurement period. Therefore, in the example requiring a long measurement period, decrease in measurement period and lowering in frequency resolution have been permitted so as not to aggravate influence by variation in speed.

Though variation in rotation speed can be detected with the use of a rotation sensor and it can also be corrected by calculation, it is often difficult to additionally provide a rotation sensor for monitoring a condition from a point of view of costs and a space for attachment. In a vibration monitoring apparatus of a wind turbine generator, a vibration spectrum is desirably analyzed without being affected by variation in rotation speed and without using a signal from a rotation sensor as much as possible.

In the diagnosis method shown in Japanese Patent Laying-Open No. 2015-34776, when a rotation speed is varied as in a reduction gear of a multijoint robot to be monitored, in order to extract a precise frequency spectrum without using a rotation sensor, a specific peak is extracted from data by applying the iterative least squares technique. Though a technique as in Japanese Patent Laying-Open No. 2015-34776 can also be applied to a condition monitoring system of a wind turbine generator, monitoring of a wind turbine generator is characterized by a long measurement period required in an example low in rotation speed and it is difficult to simply apply the technique thereto. Another suitable analysis technique is required for a monitoring target which may become low in rotation speed such as a wind turbine generator.

This invention was made to solve such problems, and an object thereof is to provide a condition monitoring apparatus capable of accurately analyzing data obtained from a sensor while increase in cost is suppressed and influence by variation in rotation is lessened in monitoring of a condition of equipment including a rotor.

Solution to Problem

In summary, this invention is directed to a condition monitoring apparatus which monitors a condition of equipment including a rotor, the condition monitoring apparatus including a storage and a calculator. The storage stores a plurality of results obtained from a plurality of divided data strings, respectively, resulting from division of a data string obtained by sampling at a regular time interval of signals from sensors provided in the equipment. The calculator estimates a plurality of rotation speeds corresponding to the plurality of divided data strings from the plurality of results accumulated in the storage, respectively, corrects the plurality of divided data strings based on the plurality of rotation speeds, respectively, and generates a corrected data string by combining the plurality of corrected divided data strings.

Preferably, the sensors detect any of vibration, sound, and acoustic emission.

Preferably, the plurality of results are a plurality of frequency spectra corresponding to the plurality of divided data strings, respectively. The calculator estimates, based on an evaluation value indicating a similarity in frequency spectrum between a first divided data string and a second divided data string among the plurality of divided data strings, a rotation speed during a period in which the second divided data string was obtained.

More preferably, the evaluation value indicating the similarity is an inner product of two frequency spectra.

Preferably, the calculator analyzes an abnormal condition of the equipment by processing the corrected data string.

Preferably, the equipment is a wind turbine generator.

Advantageous Effects of Invention

According to the present invention, since data in which influence by variation in rotation has been lessened is generated from data obtained from sensors, rotary equipment can accurately be analyzed.

DESCRIPTION OF EMBODIMENTS

An embodiment of the present invention will be described below with reference to the drawings. The same or corresponding elements in the drawings below have the same reference characters allotted and detailed description thereof will not be repeated.

Figure 1:
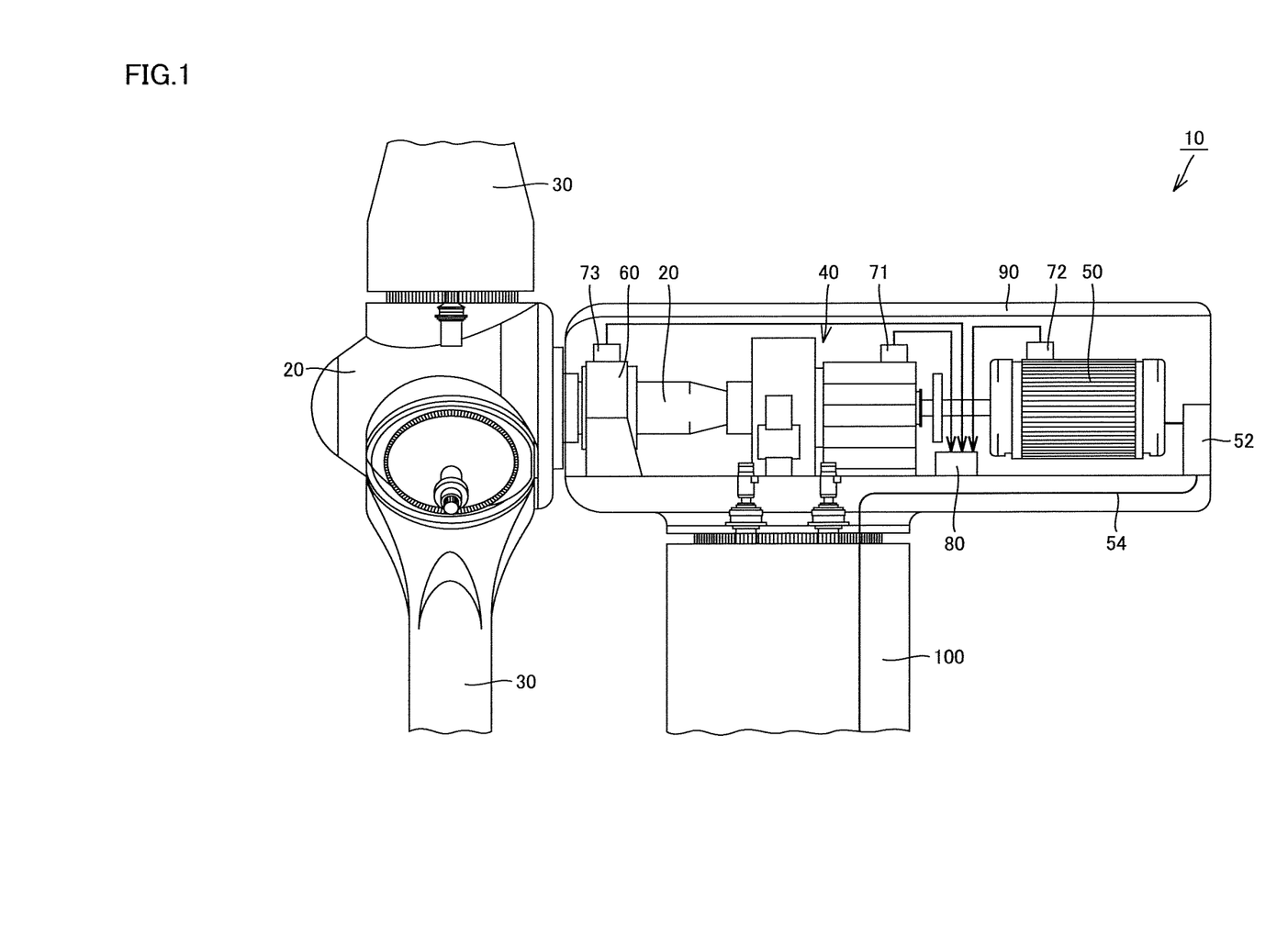
FIG. 1 is a diagram schematically showing a construction of a wind turbine generator to which a condition monitoring apparatus according to an embodiment of this invention is applied.

FIG. 1 is a diagram schematically showing a construction of a wind turbine generator to which a condition monitoring apparatus according to an embodiment of this invention is applied. Referring to FIG. 1, a wind turbine generator 10 includes a main shaft 20, a blade 30, a gearbox 40, a generator 50, a control board 52, and an electric power transmission line 54. Wind turbine generator 10 further includes a bearing 60 for the main shaft (which is simply referred to as a "bearing" below), vibration sensors 71 to 73, and a data processor 80. Gearbox 40, generator 50, control board 52, bearing 60, vibration sensors 71 to 73, and data processor 80 are stored in a nacelle 90, and nacelle 90 is supported by a tower 100.

Main shaft 20 is inserted in nacelle 90, connected to an input shaft of gearbox 40, and rotatably supported by bearing 60. Main shaft 20 transmits rotation torque generated by blade 30 which receives wind power to the input shaft of gearbox 40. Blade 30 is provided at a tip end of main shaft 20 to convert wind power to rotation torque and to transmit rotation torque to main shaft 20.

Bearing 60 is fixed in nacelle 90 and rotatably supports main shaft 20. Bearing 60 is implemented by a rolling bearing, and implemented, for example, by a spherical roller bearing, a tapered rolling bearing, a cylindrical roller bearing, and a ball bearing. The bearing may be a single-row bearing or a double-row bearing.

Gearbox 40 is provided between main shaft 20 and generator 50, and increases a rotation speed of main shaft 20 and outputs the increased rotation speed to generator 50. By way of example, gearbox 40 is implemented by a step-up gear mechanism including a planetary gear, an intermediate shaft, and a high-speed shaft. Generator 50 is connected to an output shaft of gearbox 40 and generates electric power by using rotation torque received from gearbox 40. Generator 50 is implemented, for example, by an induction generator.

Control board 52 includes an inverter (not shown). The inverter converts electric power generated by generator 50 into a system voltage and frequency and outputs the same to electric power transmission line 54 connected to the system.

Vibration sensors 71 to 73 are provided in gearbox 40, generator 50, and bearing 60, respectively, and detect vibration thereof and output detected vibration values to data processor 80.

Figure 2:
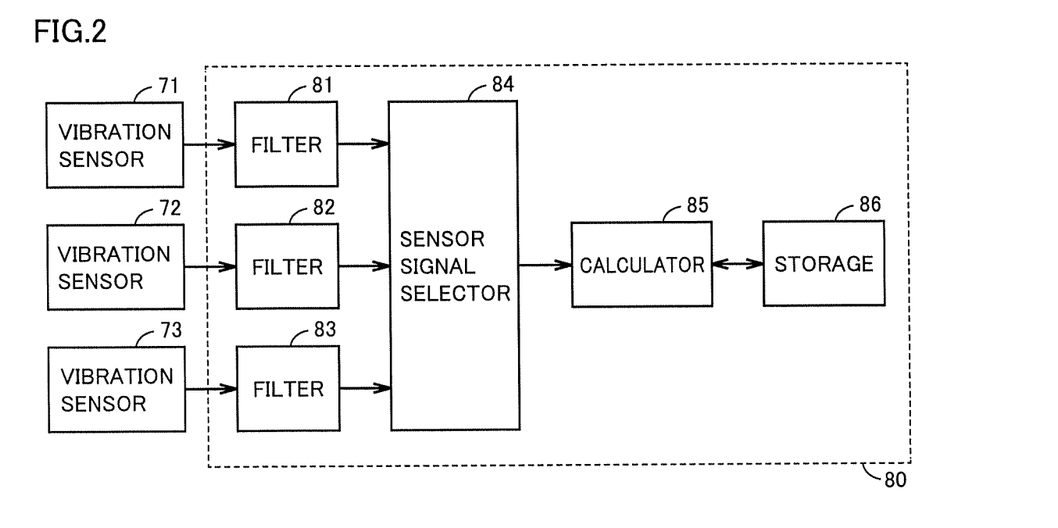
FIG. 2 is a functional block diagram showing a configuration of a data processor.

FIG. 2 is a functional block diagram showing a configuration of data processor 80. Referring to FIG. 2, data processor 80 includes filters 81 to 83, a sensor signal selector 84, a calculator 85, and a storage 86. Data processor 80 may be configured to include a not-shown transmitter and to transmit data to the outside of the wind turbine generator.

Filters 81 to 83 receive detection signals from vibration sensors 71 to 73, respectively, allow passage of a component in a predetermined specific frequency band of the received detection signals, and attenuate components in other frequency bands.

Data processor 80 may simultaneously process a plurality of signals or process a signal in a specific channel. Therefore, sensor signal selector 84 is configured to be able to receive a plurality of signal inputs from the vibration sensors and select a signal to be used.

Data processor 80 includes a central processing unit as calculator 85 and a read only memory (ROM) which stores a processing program and a random access memory (RAM) which temporarily stores data as storage 86, and further includes an input and output port for input and output of various signals (none of which is shown). Data processor 80 receives a detection value from each of vibration sensors 71 to 73, processes data, and analyzes vibration by using a method which will be described later in accordance with a program stored in the ROM. Processing performed by data processor 80 is not limited to processing by software, and the processing can also be performed by dedicated hardware (an electronic circuit). The condition monitoring apparatus may be configured such that processed vibration measurement data is transmitted to an external server (not shown) and the server analyzes vibration.

Since a characteristic spectrum of vibration of rotary equipment (vibration of a gear or vibration of a shaft) included in vibration data is varied with a rotation speed, data processor 80 detects variation in rotation speed by detecting variation in spectrum.

Data processor 80 uses obtained information on variation in speed to modify (resample) a time axis of vibration data and to correct the vibration data to be identical to vibration data in rotation at a constant speed. Thus, even vibration data collected while a rotation speed is varied can be subjected to accurate analysis of a spectrum similarly to data collected while a speed is constant.

More specifically, storage 86 stores a plurality of results obtained from a plurality of divided data strings (slots), respectively, resulting from division of a data string obtained by sampling at a regular time interval of signals from sensors 71 to 73 provided in equipment. Calculator 85 estimates a plurality of rotation speeds corresponding to the plurality of divided data strings from the plurality of results accumulated in storage 86, respectively, corrects the plurality of divided data strings based on the plurality of rotation speeds, respectively, and generates a corrected data string by combining the plurality of corrected divided data strings. Though an example in which a vibration sensor is adopted as sensors 71 to 73 is shown, a sensor which detects sound or acoustic emission may be adopted.

Preferably, the plurality of results are a plurality of frequency spectra corresponding to the plurality of divided data strings, respectively. Calculator 85 estimates, based on an evaluation value Y (shown in an expression (1) later) indicating a similarity in frequency spectrum between a first divided data string (a slot S(i)) and a second divided data string (a slot S(i+1)) among the plurality of divided data strings, a rotation speed during a period in which the second divided data string was obtained.

More preferably, the evaluation value indicating the similarity is an inner product of two frequency spectra.

Figure 7:
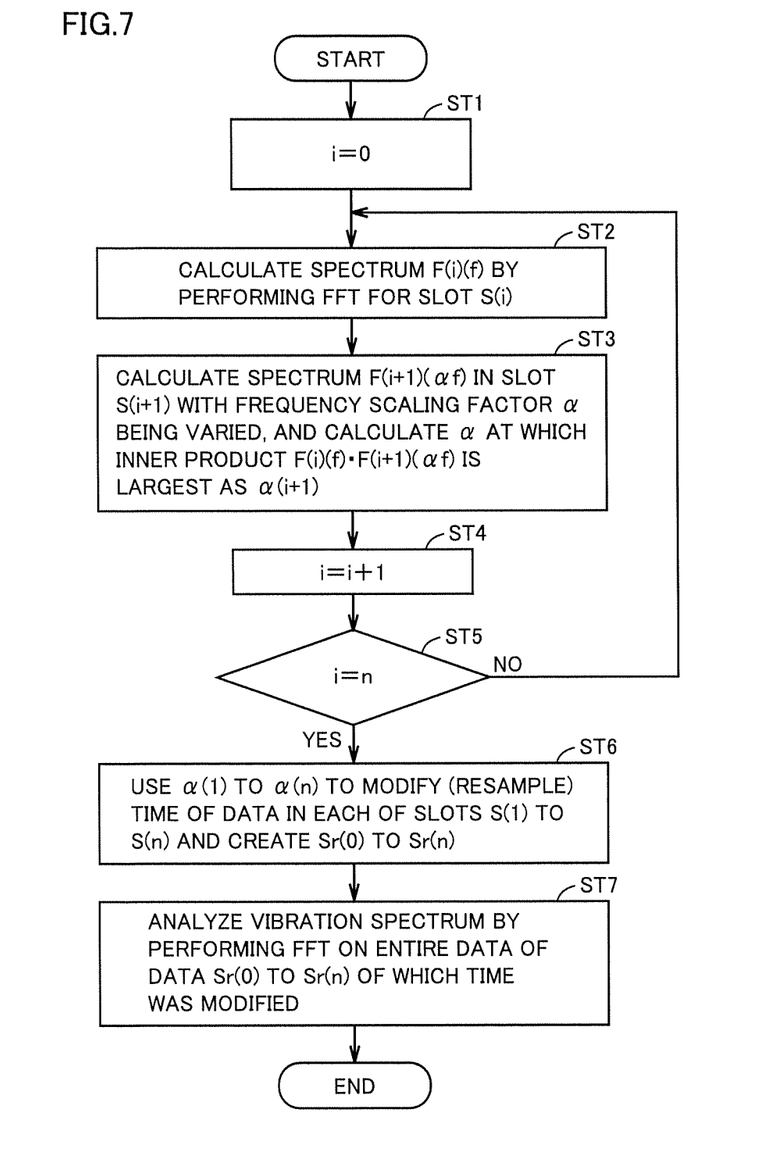
FIG. 7 is a flowchart for illustrating processing performed by the data processor.

Preferably, calculator 85 analyzes an abnormal condition of the equipment by processing the corrected data string (FIG. 7, ST7).

Preferably, the equipment monitored by the condition monitoring apparatus is a wind turbine generator.

Figure 3:
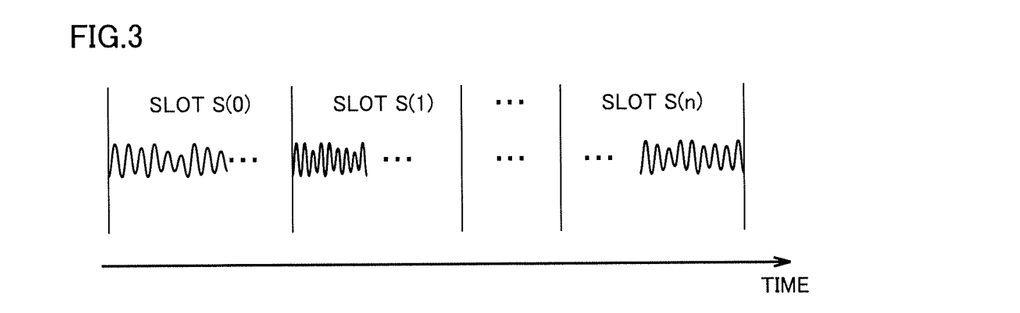
FIG. 3 is a diagram for illustrating a divided slot of vibration data.

FIG. 3 is a diagram for illustrating a divided slot of vibration data. Referring to FIG. 3, data processor 80 divides vibration data into certain time segments (slots S(1) to S(n)).

A length of a slot is set as appropriate so as to satisfy a frequency resolution and a time resolution necessary for FFT processing for a short period of time in each slot. For example, a time length of a slot is desirably not longer than one tenth of a period of variation in rotation speed.

Data processor 80 performs FFT processing on a data string in each of slots S(0) to S(n). The frequency spectrum obtained at this time is denoted as F(i)(f), where i is an integer from 0 to n.

Figure 4:
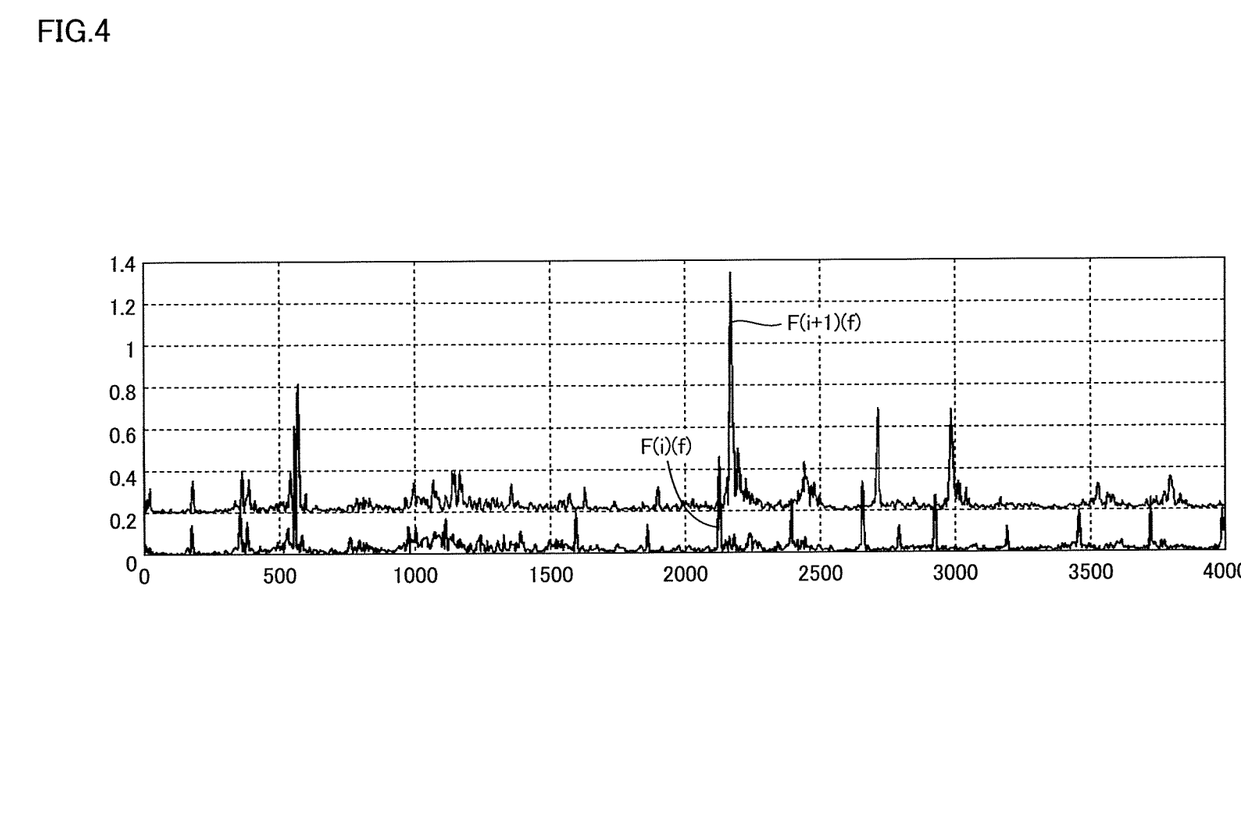
FIG. 4 is a diagram showing one example of a spectrum in frequency analysis processing performed in an ith slot S(i) and an i+1th slot S(i+1).

FIG. 4 is a diagram showing one example of a spectrum in frequency analysis processing performed in an ith slot S(i) and an i+1th slot S(i+1). In FIG. 4, F(i)(f) represents a spectrum in the ith slot (a slot (i)) and F(i+1)(f) represents a spectrum in the i+1th slot (a slot (i+1)). The ordinate represents intensity (power) and the abscissa represents a frequency. In order to avoid illegibility due to superimposition of waveforms, spectrum F(i+1)(f) is shown as being slightly offset in a direction of the ordinate.

A position of a peak which appears in a spectrum in each slot is varied with variation in rotation speed. It can thus be seen in FIG. 4 that each spectral peak of spectrum F(i+1)(f) is displaced toward a higher frequency as compared with spectrum F(i)(f).

Data processor 80 compares spectra obtained in successive time slots S(i) and S(i+1) and calculates a scaling factor for a frequency axis such that they best match with each other.

An inner product of spectrum F(i)(f) and spectrum F(i+1)(f) is calculated. An inner product value Y is shown in an expression (1) below. Inner product value Y represents a similarity between them. Y(a, b) represents a sum of products (an inner product) of a spectrum for each frequency in a slot a and a spectrum for each frequency in a slot b, and Σ calculation means calculation of a total sum of products of spectra in adjacent slots in connection with a discrete frequency f.

$$Y(i,i+1)=\Sigma F(i)(f) \cdot F(i+1)(f) \tag{1}$$

A similarity may be evaluated by dividing each of the two spectra by an absolute value or an autocorrelation value C(i) of a vector to find a correlation coefficient CORR. Autocorrelation value C(i) and correlation coefficient CORR(i) are shown in expressions (2) to (4) below. sqrt represents calculation of a square root.

$$C(i)=\text{sqrt}\{\Sigma F\{i\}(f) \cdot F\{i\}(f)\} \tag{2}$$

$$C(i+1)=\text{sqrt}\{\Sigma F\{i+1\}(f) \cdot F\{i+1\}(f)\} \tag{3}$$

$$CORR(i,i+1)=\text{Correlation}(F\{i\}(f),F\{i+1\}(f))=Y(i,i+1)/\{C(i) \cdot C(i+1)\} \tag{4}$$

If the rotation speed is constant, a spectrum will substantially be the same. Therefore, both of inner product value Y and correlation coefficient CORR(i, i+1) (similarity) are close to 1. If a rotation speed is varied and a spectrum is varied between slots, a similarity will be lowered.

Data processor 80 uses such a correlation value of a spectrum to find a rate of variation (a scaling factor α for a frequency) in rotation speed.

Figure 5:
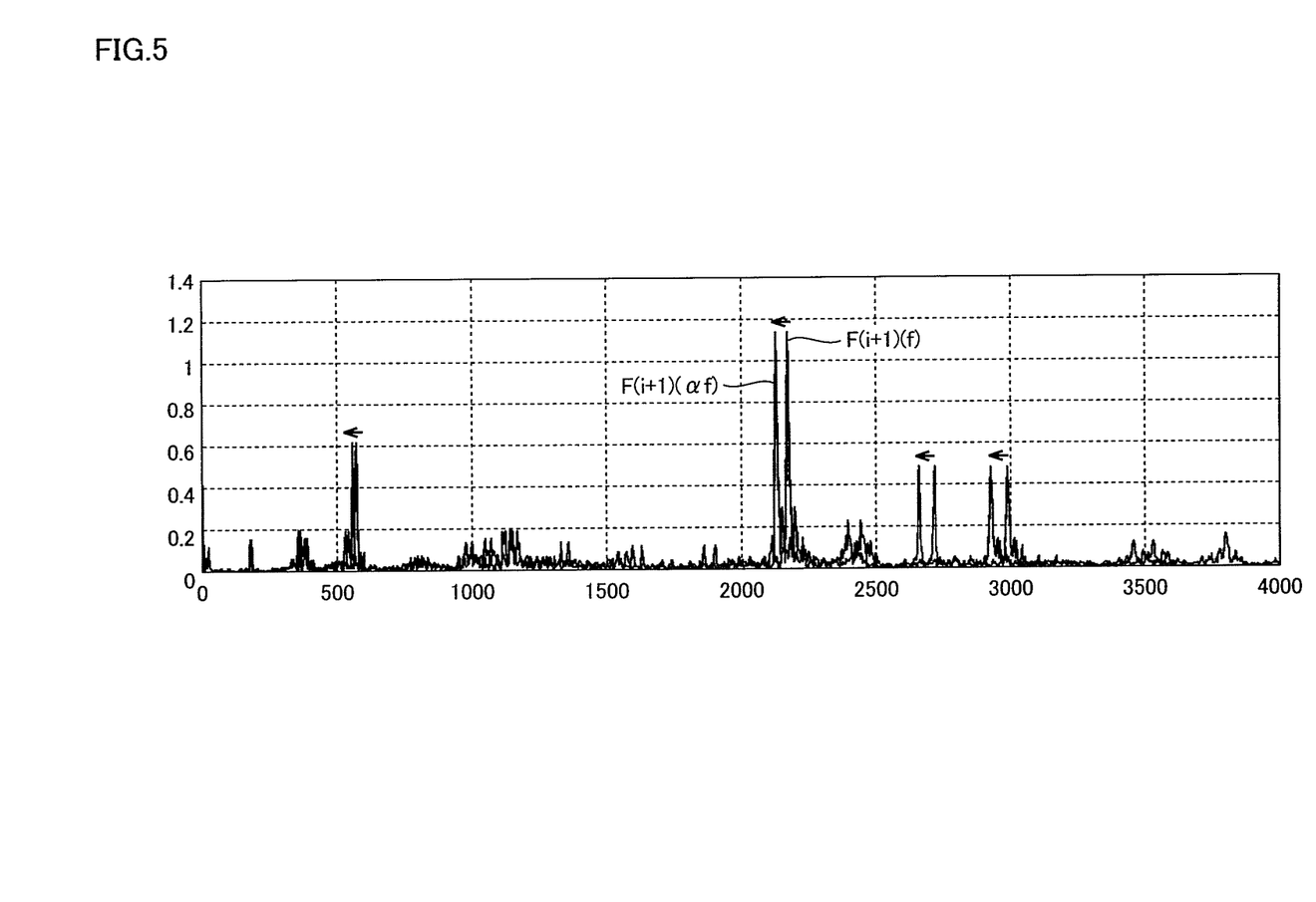
FIG. 5 is a diagram for illustrating processing applied to a spectrum in the i+1th slot.

FIG. 5 is a diagram for illustrating processing applied to a spectrum in the i+1th slot. In FIG. 5, spectrum data is shifted in a direction of a frequency axis with a scaling factor for a frequency being set to a and with a being adjusted, for example, within a range of α=0.95 to 1.05 (corresponding to ±5%). F(i+1)(αf) represents a spectrum which is α-fold of spectrum F(i+1)(f) in the direction of the frequency axis.

α at which Y(i, i+1, α) shown in an expression (5) below or CORR(i+1, α) shown in an expression (6) is largest is calculated by varying a, for example, in increments or decrements of 0.01. Y(a, b, c) represents a sum of products (an inner product) of a spectrum for each frequency (f1, f2, f3, . . . ) in slot a and a spectrum for each c-fold frequency (f1·c, f2·c, f3·c, . . . ) in slot b.

$$Y(i,i+1,\alpha)=\Sigma F(i)(f) \cdot F(i+1)(\alpha f) \tag{5}$$

$$CORR(i,i+1,\alpha)=\text{Correlation}(F\{i\}(f),F\{i+1\}(\alpha f)) \tag{6}$$

A value of α at which largest inner product value Y is obtained is calculated and denoted as α(i+1). α(i+1) represents a scaling factor at which data in two slots best match with each other. A rate of variation in spectrum in a section of slot S(i+1) with respect to slot S(i) is calculated as α(i+1). Since a peak frequency is α(i+1)-fold owing to variation in rotation speed, a rotation speed is calculated as α(i+1)-fold and a rate of variation in speed between slots is calculated.

As set forth above, by varying a frequency axis by varying a, scaling factor α(i+1) at which inner product value Y of two spectra is largest (two spectra are best superimposed on each other) is calculated.

Figure 6:
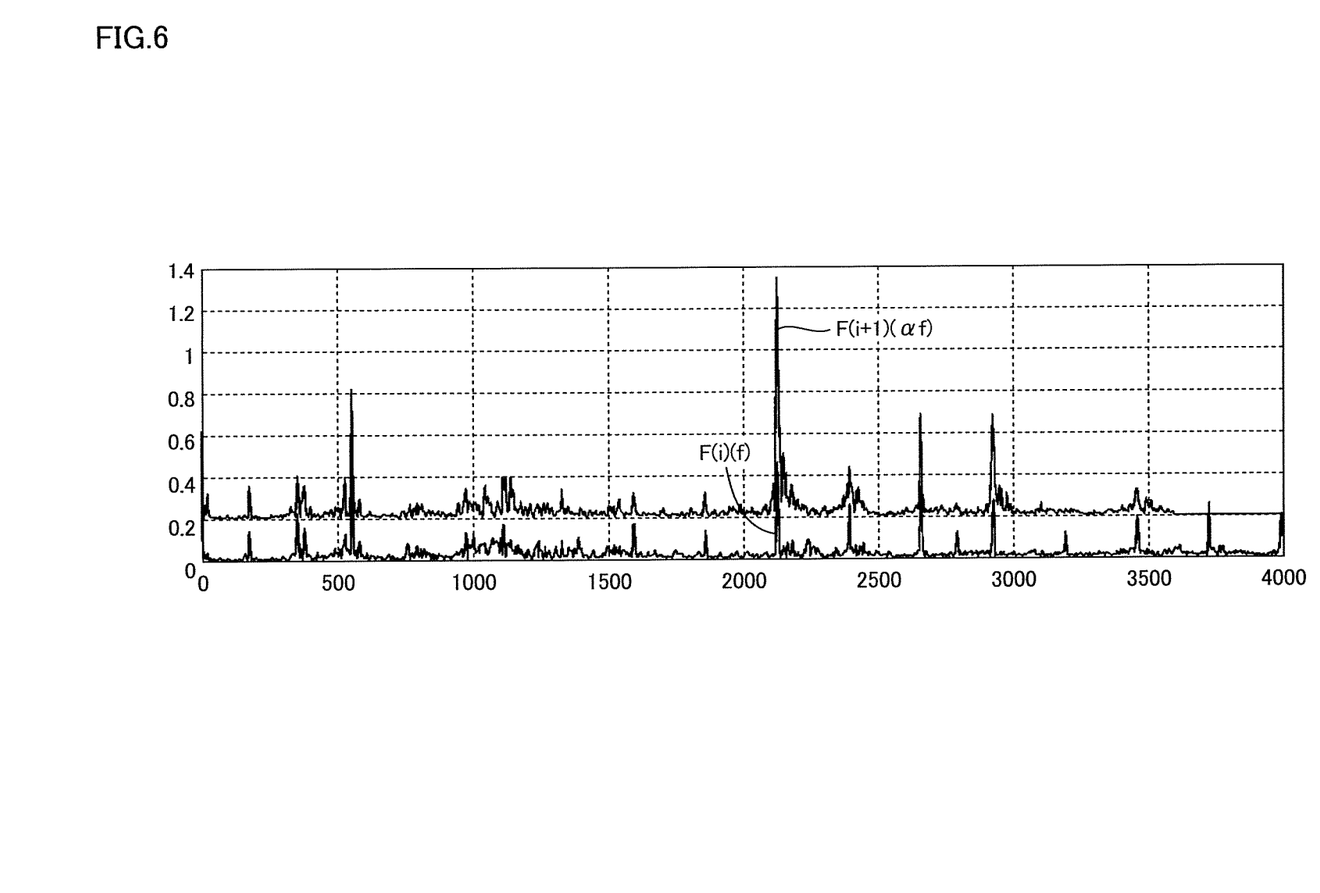
FIG. 6 is a diagram showing a spectrum when a at which Y provides a largest value is selected.

FIG. 6 is a diagram showing a spectrum when a at which Y provides a largest value is selected. As shown in FIG. 6, in a spectrum waveform in which a similarity is highest, spectrum F(i+1)(αf) to which a giving largest inner product value Y is applied is observed to match in each peak with spectrum F(i)(f).

By thus sequentially calculating a rate of variation in speed between adjacent slots until the last slot, a rate of variation in speed from the first slot to the last slot is estimated.

In processing for calculating a similarity, a maximum value of the following value may be evaluated and calculated with a spectrum in the first slot S(0) being defined as the reference:

$$\text{CORR}(0,i,\alpha) = \text{Correlation}(F\{0\}(f), F\{i\}(\alpha f)) \quad (7)$$

where i=1, 2, . . . , n.

A speed ratio α(i) from the first slot to the last slot is estimated by calculating, between slots, a value shown in the expression (7). By using this result, a rotation speed ωi in each slot can be calculated with a rotation speed ω0 in the first slot being defined as the reference:

$$\omega i = \omega 0 * \alpha(i)$$

where i=1, 2, . . . , n.

Desirably, a range of frequencies for which an inner product is calculated is set to a region where a characteristic of a spectrum is well exhibited, and a frequency up to approximately ten times as high as a characteristic frequency such as a gear mesh frequency or a shaft rotation frequency is included therein. With only a low-frequency component, accuracy in detection of a rate of variation in speed is low. In a region at a high frequency, a resonance peak not dependent on a rotation speed may appear and may interfere detection of a component which varies with a rotation speed. Therefore, a range of interest of comparison may be selected as appropriate in accordance with a measurement target.

Thereafter, based on obtained information on a speed, data resampled at a regular interval by modifying time of the data in each slot is created.

FIG. 7 is a flowchart for illustrating processing performed by the data processor. Referring to FIG. 7, initially, in step ST1, data processor 80 sets a variable i to zero as an initial value.

In succession, in step ST2, data processor 80 calculates a spectrum F(i)(f) by performing FFT for slot S(i).

Then, in step ST3, data processor 80 compares spectra F(i)(f) and F(i+1)(αf) with each other obtained in successive time slots, and calculates scaling factor α for the frequency axis such that they best match with each other. Specifically, as described with reference to FIGS. 4 to 6, spectrum F(i+1)(αf) in slot S(i+1) is calculated with scaling factor α for a frequency being varied, and α at which Y(i, i+1, α) given in the expression (5) or CORR(i, i+1, α) given in the expression (6) is largest is calculated as α(i+1).

Figure 8:
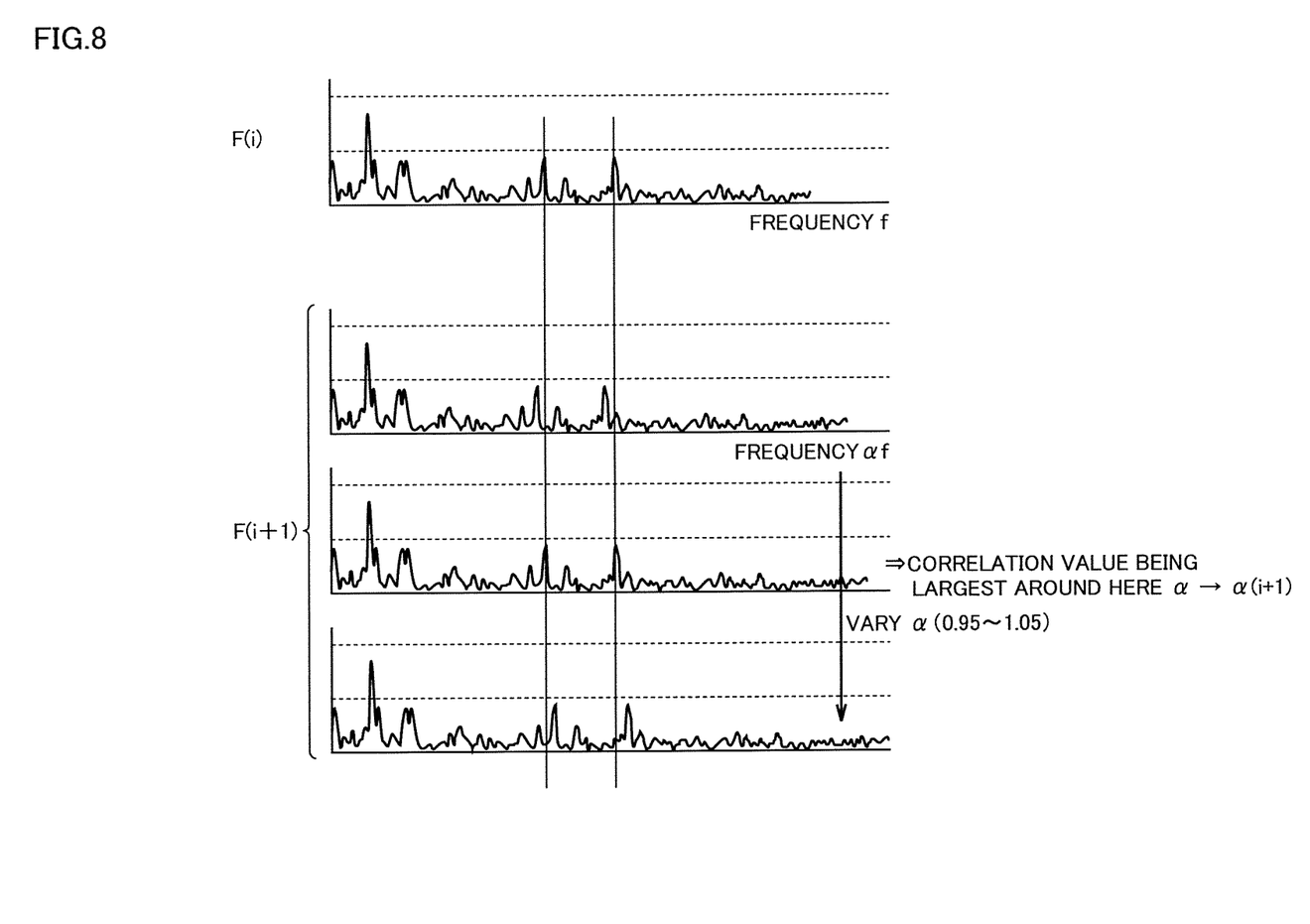
FIG. 8 is a diagram of search for a(i+1) high in similarity by varying a scaling factor α for a frequency f of a spectrum F(i+1) with respect to a spectrum F(i)(f).

FIG. 8 is a diagram of search for a high in similarity by varying scaling factor α for a frequency f of spectrum F(i+1) with respect to spectrum F(i)(f). In FIG. 8, α at which peaks match with each other is defined as α(i+1).

In the flowchart in FIG. 7, a similarity between the ith slot S(i) and the i+1th slot S(i+1) is evaluated and scaling factor α(i+1) for the frequency in each slot is calculated. As described with reference to the expression (7), however, evaluation may be made with the first slot S(0) being defined as the reference. A similarity between each slot S(i+1) and the first slot S(0) may directly be evaluated to calculate scaling factor α(i+1) for the frequency.

With the first slot being defined as the reference, when data in which a value of α(i) is varied gradually from slot S(0) is assumed, a calculation method is desirably devised such that a range of search for α at which a maximum correlation value is attained is limited to a range around α(i−1) that precedes. When a pattern is greatly different between slot S(0) and slot S(i), a correlation value becomes small in this calculation method. Therefore, in the method shown in the flowchart in FIG. 7, on the premise that correlation between successive slots S(i) and S(i+1) considered to initially be close to each other in pattern is calculated, a range of search for α is narrowed to ±X % of α(i−1). In this case, since adjacent slots are characterized by their high correlation with each other, variation in speed is better followed. In this case, since calculated α(k) represents a speed ratio between adjacent slots, subsequent processing is performed with the speed ratio being finally converted to a ratio to slot S(0) such as α'(1)=α(0)*α(1) . . . , α'(i)=α'(i−1)+α(i), where α(0)=1.

When calculation is performed between slot S(0) and slot S(i), calculated α(i) directly represents a rate of variation in speed. When calculation between adjacent slots is performed as in the method in FIG. 7, however, calculated α(i) should be converted to a speed ratio to the first slot and then α'(i) described above should be calculated.

Referring again to FIG. 7, data processor 80 increments variable i in step ST4, and determines whether or not a condition of i=n is satisfied in step ST5, where n represents a number of the last slot resulting from division in FIG. 3.

While a condition of i<n is satisfied, processing in ST2 to ST4 is repeated. Frequency analysis processing is thus performed with vibration data being divided into certain time segments (slots) (short FFT processing).

When evaluation of a similarity among slots S(1) to S(n) is completed and α(1) to α(n) are obtained, in step ST6, data processor 80 modifies time of data in each slot S(i) based on obtained information on speed ωi and creates data in slot Sr(i) resampled at a regular interval.

Figure 9:
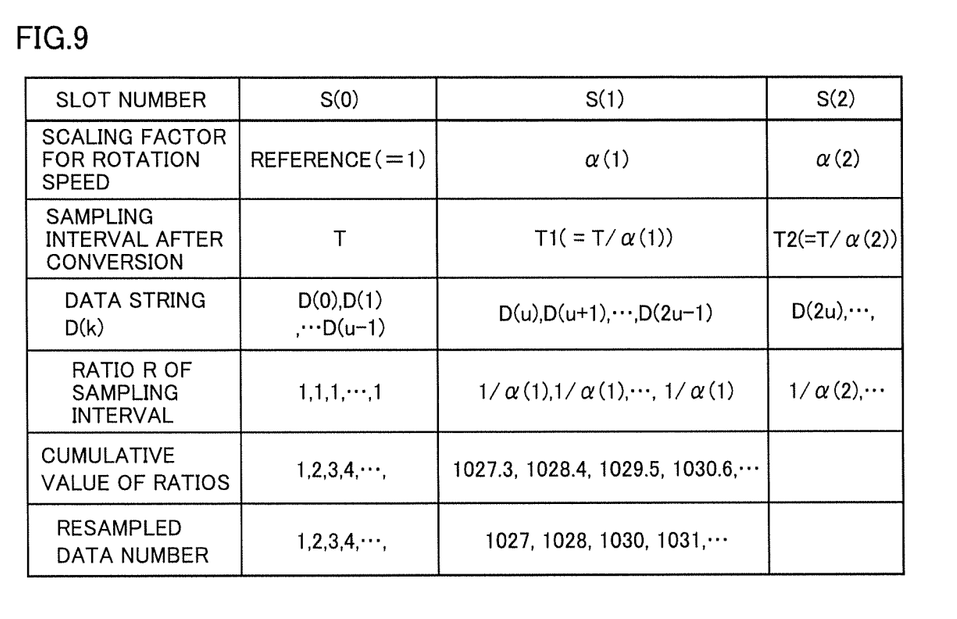
FIG. 9 is a first diagram for illustrating resampling processing.
Figure 10:
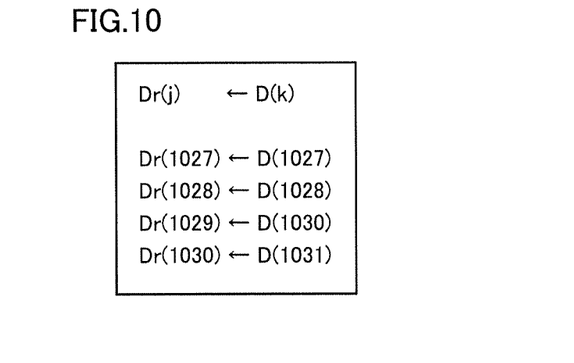
FIG. 10 is a second diagram for illustrating resampling processing.

FIG. 9 is a first diagram for illustrating resampling processing. FIG. 10 is a second diagram for illustrating resampling processing.

With a rotation speed in slot S(0) being defined as the reference (a ratio 1), scaling factors for a rotation speed in slots S(1) and S(2) are denoted as α(1) and α(2), respectively. Since slot S(0) is defined as the reference, a result of conversion of a sampling interval between slots S(1) and S(2) with the use of speed ratio α is expressed as T1=T/α(1) and T2=T/α(2), where T represents a sampling interval.

An input signal data string as a whole is denoted as D(k), where k represents an integer from 0 to M. This data is divided, for example, into slots S(0) to S(n) each including u data strings, where relation of n=M/u is satisfied.

Specifically, slot S(0) includes u data strings D(0) to D(u−1), slot S(1) includes u data strings D(u) to D(2u−1), and slot S(2) includes u data strings D(2u) to D(3u−1).

A ratio R of a time interval between pieces of data in slots is as shown in FIG. 9. A sequence of integers is created by rounding off a cumulative value of these ratios R in each slot, and it is defined as a resampled data number. Since ratio R of a time interval in slot S(0) is 1, the cumulative value increases in increments of 1 such as 1, 2, 3, 4, . . . Ratio R of a time interval in slot S(1) is 1/α(1). Therefore, if a condition of 1/α(1)=1.1 is assumed, the cumulative value increases in increments of 1.1 such as 1027.3, 1028.4, 1029.5, 1030.6, . . . A data number expressed as an integer is 1, 2, 3, 4, . . . for slot S(0), and as 1027, 1028, 1030, 1031, . . . for slot S(1).

Original data of a resampled data number is sequentially placed into data Dr so that a resampled data string is created. Correspondence between original data D(k) and resampled data Dr(j) is as shown in FIG. 10. Since resultant data string Dr(j) is continuous data, processing such as FFT can be performed without any problem.

Figure 11:
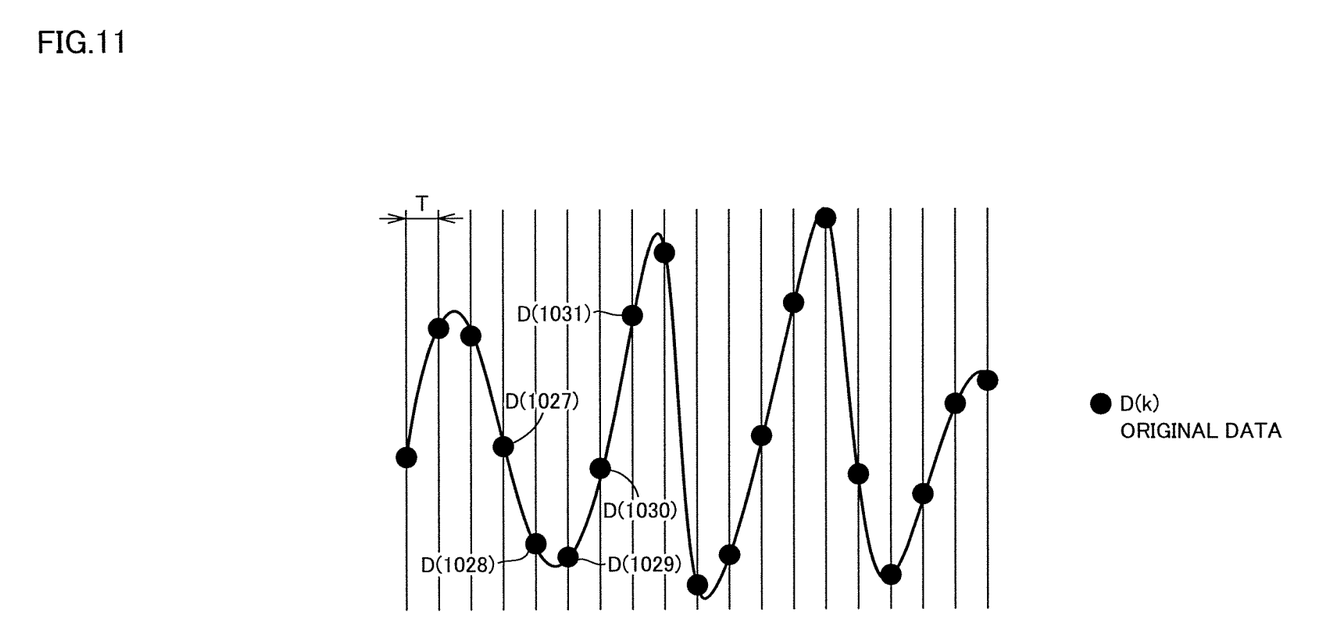
FIG. 11 is a conceptual diagram showing a data string D(k) in a slot S(1) shown in FIG. 9.
Figure 12:
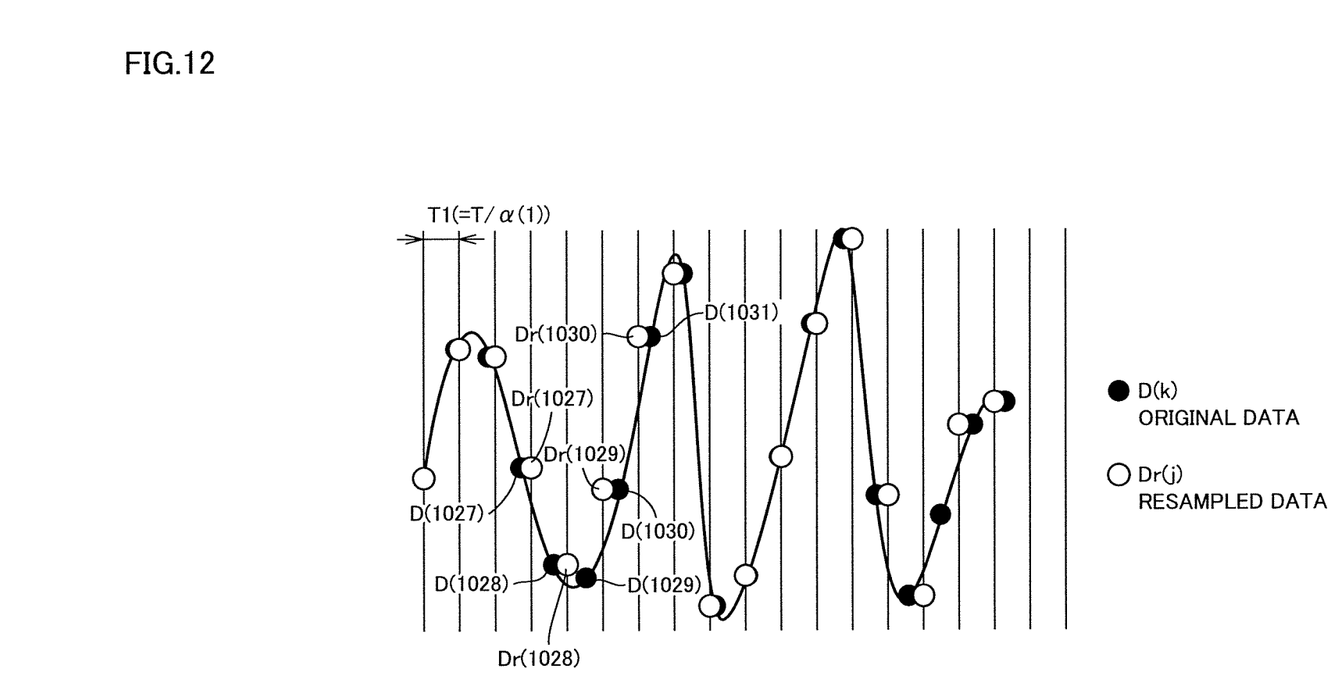
FIG. 12 is a conceptual diagram showing data string D(k) in slot S(1) and a resampled data string Dr(j) as being superimposed on each other.

FIG. 11 is a conceptual diagram showing a data string D(k) in slot S(1) shown in FIG. 9. FIG. 12 is a conceptual diagram showing data string D(k) in slot S(1) and a resampled data string Dr(j) as being superimposed on each other.

As shown in FIG. 11, original data string D(k) is sampled regularly at a sampling interval T. In a section from data D(1027) to D(1030), some of data is thinned by resampling (when a condition of $\alpha(1)>1$ is satisfied). As shown in FIG. 12, after resampling, a sampling interval is shorter. Consequently, as described with reference to FIG. 10, D(1029) in original data string D(k) is excluded. Therefore, data identical in data number k are placed in Dr(1027) to Dr(1028) such as D(1027) to D(1028), whereas data of which data number k is added by one such as D(1030) is placed in Dr(1029). When a condition of $\alpha(i)<1$ is satisfied, instead of thinning out data, data is interpolated as appropriate. For example, as data which is lacking, any data that precedes or follows may be copied and placed or a value calculated by averaging data that precedes and follows may be placed.

Since data of which fluctuation has been corrected can thus be generated from data obtained in an environment where the rotation speed fluctuates, accuracy in analysis of a frequency peak in frequency analysis is improved.

Referring again to FIG. 7, in step ST7, entire data Dr(j) in slots Sr(1) to Sr(n) constituted of resampled data are subjected to FFT to analyze a vibration spectrum, and processing in the flowchart ends. In this case, it can be expected that a frequency peak is obtained more clearly than in FFT on data before resampling. In particular, it is effective for an example in which a wind speed is low and a rotation speed is low, because the number of pieces of data Dr(j) as a whole should be increased by using data collected for a long period of time for improving accuracy.

Frequency analysis including resampling processing described in the present embodiment is effective when vibration generated by rotary equipment is sufficiently large relative to background noise. When vibration generated at a constant frequency such as inverter noise or resonance of a component (vibration at a natural frequency) is dominant, evaluation of a similarity does not go well and followability becomes poor. Therefore, in a wind turbine generator, the data processing method disclosed in the present embodiment is desirably applied to a mechanical component which rotates at a constant rotation speed ratio and is relatively large in vibration such as a gearbox or a generator.

When data collected while a rotation speed is varied is subjected to processing for varying a sampling interval so as to follow variation in rotation speed, ideally, data sampled at the same interval of a rotation angle in spite of variation in rotation speed can be obtained. When a vibration component is generated in synchronization with rotation, a peak frequency obtained in FFT is varied with variation in rotation speed. When resampling processing is performed, however, a peak frequency remains the same without varying. On the other hand, a component at a constant frequency not affected by a rotation speed such as electric noise represented by inverter noise or mechanical resonance is varied to a fluctuating component when it is resampled. Since a frequency spectrum of inverter noise or the like irrelevant to rotation is blurred, analysis of a vibration component further in synchronization with rotation is advantageously facilitated.

When a variation in rotation speed is great, improvement as below may be made. Specifically, a series of processes for estimating variation in speed is performed to find an average speed ratio in slot S(i). When a width of a slot is large or variation in speed between adjacent slots is great, however, the speed ratio may vary discontinuously and stepwise between slots. In such a case, discontinuous variation can be made gentler by (1) calculation of a speed ratio by interpolation between slots as appropriate or (2) decrease in width of a slot for which a speed ratio is calculated. Specifically, data in slot S(i) to slot S(i+1) may linearly be interpolated by regarding all data as linearly varying from speed $\omega(i)$ to $\omega(i+1)$ or may be varied in fine steps at an interval of one severalth of a slot interval.

Resampling processing may be performed on a waveform resulting from envelope processing of vibration data. Even a vibration waveform of which characteristic is less likely to appear in raw vibration data may exhibit its characteristic in a spectrum of an envelope waveform subjected to envelope processing, and processing for detecting a similarity may be facilitated. In such a case, sensitivity in detection of variation in frequency can be improved.

Though a wind turbine generator is exemplified in the description above as a monitoring target to which a condition monitoring apparatus is applied, limitation thereto is not intended. The condition monitoring apparatus described above is applicable to any apparatus including a rotor of which rotation is varied. Though an example in which processing for correcting data is performed in a monitoring apparatus in a nacelle of a wind turbine generator is shown, data may be transferred in connection with the outside and the processing may be performed in an external analyzer.

It should be understood that the embodiment disclosed herein is illustrative and non-restrictive in every respect. The scope of the present invention is defined by the terms of the claims rather than the description of the embodiment above and is intended to include any modifications within the scope and meaning equivalent to the terms of the claims.

REFERENCE SIGNS LIST 10 wind turbine generator; 20 main shaft; 30 blade; 40 gearbox; 50 generator; 52 control board; 54 electric power transmission line; 60 bearing; 71 to 73 vibration sensor; 80 data processor; 81 to 83 filter; 84 sensor signal selector; 85 calculator; 86 storage; 90 nacelle; 100 tower

The invention claimed is:

1. A condition monitoring apparatus which monitors a condition of equipment including a rotor, the condition monitoring apparatus comprising:
a storage configured to store a plurality of results obtained from a plurality of divided data strings, respectively, resulting from division of a data string obtained by sampling at a regular time interval of signals from sensors provided in the equipment, where in the plurality of results includes a plurality of frequency spectra corresponding to the plurality of divided date strings, respectively; and
a calculator configured to 1) estimate a plurality of rotation speeds corresponding to the plurality of divided data strings from the plurality of results accumulated in the storage, respectively, 2) correct the plurality of divided data strings based on the plurality of rotation speeds, respectively, and 3) generate a corrected data string by combining the plurality of corrected divided data strings,
wherein estimating the plurality of rotation speeds includes sequentially calculating a rate of variation in speed between each pair of divided data strings that are adjacent each other in the plurality of divided data strings.

2. The condition monitoring apparatus according to claim 1, wherein
the sensors detect any of vibration, sound, and acoustic emission.

3. The condition monitoring apparatus according to claim 1, wherein
the plurality of results are a plurality of frequency spectra corresponding to the plurality of divided data strings, respectively, and
the calculator estimates, based on an evaluation value indicating a similarity in frequency spectrum between a first divided data string and a second divided data string among the plurality of divided data strings, a rotation speed during a period in which the second divided data string was obtained.

4. The condition monitoring apparatus according to claim 3, wherein
the evaluation value indicating the similarity is an inner product of two frequency spectra.

5. The condition monitoring apparatus according to claim 1, wherein
the calculator is configured to analyze an abnormal condition of the equipment by processing the corrected data string.

6. The condition monitoring apparatus according to claim 1, wherein
the equipment is a wind turbine generator.

* * * * *